United States Patent Office 3,216,808
Patented Nov. 9, 1965

3,216,808
NEUTRON-ABSORPTIVE GLASS
Frederic L. Bishop and Alfred D. Pinotti, Toledo, Ohio, assignors, by mesne assignments, to Owens-Illinois Glass Company, Toledo, Ohio, a corporation of Ohio
No Drawing. Filed July 12, 1962, Ser. No. 209,306
12 Claims. (Cl. 65—18)

This invention relates to glasses capable of absorbing neutron radiation. More specifically, this invention relates to glass compositions which are particularly suitable for absorbing neutrons such as are liberated in atomic energy applications.

The principal object of the present invention is to provide glasses capable of absorbing neutrons.

A further object of this invention is to provide methods of preparing such neutron-absorptive glasses.

Still further objects and advantages of the invention will be apparent from the description which follows.

Suitable glass compositions according to the present invention are those which possess the following constituents in percentages by weight.

| Constituent: | Percent |
|---|---|
| $SiO_2$ | 60–85 |
| $B_2O_3$ | 0–20 |
| $Al_2O_3$ | 0–20 |
| $K_2O$ | 0–4 |
| $Na_2O$ | 0–7 |
| $Li_2O$ | 0–1 |
| CaO | 0–12 |
| MgO | 0–9 |
| BaO | 0–3 |
| $Fe_2O_3$ | 0–0.05 |
| Cl | 0–0.1 |

In the absence of any $B_2O_3$, a preferred range of compositions of glasses (aluminosilicate) according to this invention would be as follows.

| Constituent: | Percent |
|---|---|
| $SiO_2$ | 60–65 |
| $B_2O_3$ | None |
| $Al_2O_3$ | 15–20 |
| $K_2O$ | 0–0.5 |
| $Na_2O$ | 0–0.5 |
| $Li_2O$ | None |
| CaO | 10–15 |
| MgO | 7–10 |
| BaO | 0–3 |

Where $B_2O_3$ is present, a preferred range of compositions of glasses (borosilicate) according to this invention would be as follows.

| Constituent: | Percent |
|---|---|
| $SiO_2$ | 70–81 |
| $B_2O_3$ | 9–19 |
| $Al_2O_3$ | 2–18 |
| $K_2O$ | 0–4 |
| $Na_2O$ | 2–6.5 |
| $Li_2O$ | 0–1 |
| CaO | 0–1 |
| MgO | 0–1 |
| BaO | 0–3 |

A specific preferred glass composition (I) according to this invention has the following constituents expressed in percentages by weight.

| Constituent: | Percent |
|---|---|
| $SiO_2$ | 80.6 |
| $B_2O_3$ | 13.0 |
| $Al_2O_3$ | 2.2 |
| $Fe_2O_3$ | 0.05 |
| Cl | 0.1 |

To the above glass composition (I) is added from about 2–25% by weight of gadolinium oxide and/or samarium oxide.

Further specific examples of preferred glass compositions according to the present invention are the following where percentages are by weight:

| Constituent | II | III |
|---|---|---|
| $SiO_2$ | 74.7 | 61.5 |
| $B_2O_3$ | 11.2 | None |
| $Al_2O_3$ | 5.0 | 18.8 |
| $K_2O$ | 0.4 | None |
| $Na_2O$ | 5.8 | None |
| BaO | 2.8 | None |
| CaO | None | 11.4 |
| MgO | None | 8.2 |

In each instance from about 2–25% is gadolinium oxide and/or samarium oxide is added to Compositions II and III.

Glasses having the compositions, exclusive of the samarium oxide and/or gadolinium oxide, falling within the ranges recited above are also characterized as having a high degree of chemical durability which is the resistance of a glass to chemical attack by its environment.

A general use to which the novel glass compositions of this invention can be applied is in the manufacture of Raschig rings for neutron-absorption in packed towers. These rings can be made according to common practice which consists of melting a glass composition having the percentage range of constituents within the range recited above and forming the resulting molten glass into tubing. The tubing is thereafter cut into sections and fire polished.

However, in view of the high cost of the neutron-absorbing constituents, namely, the gadolinium oxide or samarium oxide, it will be found more economical to melt the basic durable glass composition in a pot or small chamber, for example, including the samarium oxide, gadolinium oxide or a combination of the two in such quantities as required. The base glass and added oxide introduced to provide neutron absorption in the final glass are then melted into a homogeneous glass. The resulting molten glass in cooled condition is then ground and pressed into prescribed shapes such as right-cylindrical short-length tubular lengths either with or without a binder. The prescribed pressed shapes are then fired to remove the binder when present and the glass is sintered into semi-fused rigid form.

Alternatively, the basic glass composition is melted and ground into particulate form and particles of samarium oxide or gadolinium oxide or a mixture thereof are added to the powdered glass in prescribed amount ranging from 2–25% by weight. The particles are then fully intermixed, pressed into desired shape and sintered into final form. In this case, the neutron-absorbing oxide particles retain their individual identity within the semi-fused sintered articles. The articles in final form exhibit a neutron-absorption capacity somewhat similar to the results obtainable wherein the prescribed oxide is incorporated into the base glass during melting. The foregoing procedure may be preferred to avoid loss of the costly neutron-absorbing constituent during melting.

In another modification of the present invention the semi-fused sintered rigid glass articles are coated with a fused encapsulating layer of the base glass to completely enclose all exterior surfaces of the articles. The coating or glass is preferably one which is boron-free and a composition which is chemically durable. Having the articles such as packing rings finally coated with a fused exterior layer of base glass minimizes the loss of the neutron-absorbing constituent from the sintered articles such as by leaching while in use.

Each of the above-described methods avoids filling a tank furnace with the neutron-absorbing constituent in the glass and having large amounts of cullet remaining. Further each of these methods provides for efficient use of the costly samarium oxide or gadolinium oxide. Economical use of these constituents is necessary in view of their costing as much as $200.00 per pound.

Although Raschig rings have been mentioned as suitable for manufacture by this method, it is apparent that other packings such as Lessing rings and Berl saddles can be made by this process.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

We claim:
1. A neutron-absorptive glass consisting essentially of
(a) a chemically durable glass containing by weight:

| | Percent |
|---|---|
| $SiO_2$ | 60–85 |
| $B_2O_3$ | 0–20 |
| $Al_2O_3$ | 0–20 |
| $K_2O$ | 0–4 |
| $Na_2O$ | 0–7 |
| $Li_2O$ | 0–1 |
| CaO | 0–12 |
| MgO | 0–9 |
| BaO | 0–3 |
| $Fe_2O_3$ | 0–0.05 |
| Cl | 0–0.1 | to which has been added (b) about 2 to 25% by weight of an oxide selected from the group consisting of gadolinium oxide and samarium oxide.

2. A neutron-absorptive glass comprising a chemically durable glass containing by weight about 80.6% silicon dioxide; 13.0% boric oxide; 22% aluminum oxide; 0.05% ferric oxide; 0.1% chlorine to which has been added about 2 to 25% by weight of an oxide selected from the group consisting of gadolinium oxide and samarium oxide.

3. A neutron-absorptive glass according to claim 1 which contains about 2 to 25% by weight of gadolinium oxide.

4. A neutron-absorptive glass according to claim 1 which contains about 2 to 25% by weight of samarium oxide.

5. A packing element having the composition of claim 1.

6. The method of making a neutron-absorbing glass article comprising the steps of melting a chemically durable glass composition containing 2 to 25 percent by weight of a neutron-absorbing oxide constituent selected from the group consisting of gadolinium oxide, samarium oxide and mixtures thereof, cooling said glass so as to solidify the same, grinding said solidified glass composition into particulate form, pressing said glass in particulate form into a prescribed shape and sintering said prescribed pressed shape into semi-fused rigid condition.

7. The method in accordance with claim 6, wherein said glass is pressed into the shape of a short-length tube prior to sintering.

8. The method in accordance with claim 6, wherein said glass is essentially boron-free.

9. The method of making a neutron-absorbing glass article comprising the steps of melting a chemically durable glass composition, cooling said glass so as to solidify the same, grinding said solidified cooled glass into particulate form, introducing 2 to 25% by weight of a neutron absorbing constituent in particulate form into said glass to form a mixture thereof, said neutron-absorbing constituent being selected from the group consisting of gadolinium oxide, samarium oxide and mixtures thereof, pressing said particulate mixture into a prescribed shape, and sintering said prescribed pressed shape into semi-fused rigid condition.

10. The method of making Raschig rings comprising the steps of melting a chemically durable glass composition, cooling said glass so as to solidify the same, grinding said solidified cooled glass into particulate form, introducing 2 to 25% by weight of a neutron-absorbing constituent in particulate form into said glass to form a mixture thereof, said neutron-absorbing constituent being selected from the group consisting of gadolinium oxide, samarium oxide and mixtures thereof, pressing said particulate mixture into the requisite shape, and sintering said pressed shape into semi-fused rigid condition.

11. The method of making Lessing rings comprising the steps of melting a chemically durable glass composition, cooling said glass so as to solidify the same, grinding said solidified cooled glass into particulate form, introducing 2 to 25% by weight of a neutron-absorbing constituent in particulate form into said glass to form a mixture thereof, said neutron-absorbing constituent being selected from the group consisting of gadolinium oxide, samarium oxide and mixtures thereof, pressing said particulate mixture into the requisite shape, and sintering said pressed shape into semi-fused rigid condition.

12. The method of making Berl saddles comprising the steps of melting a chemically durable glass composition, cooling said glass so as to solidify the same, grinding said solidified cooled glass into particulate form, introducing 2 to 25% by weight of a neutron-absorbing constituent in particulate form into said glass to form a mixture thereof, said neutron-absorbing constituent being selected from the group consisting of gadolinium oxide, samarium oxide and mixtures thereof, pressing said particulate mixture into the requisite shape, and sintering said pressed shape into semi-fused rigid condition.

References Cited by the Examiner

UNITED STATES PATENTS

| 2,714,227 | 8/55 | Graham et al. | 18—59.2 |
|---|---|---|---|
| 2,987,777 | 6/61 | Beaver et al. | 18—59.2 |
| 2,988,522 | 6/61 | Smith | 252—478 |
| 2,988,523 | 6/61 | Erskine et al. | 252—478 |
| 3,024,118 | 3/62 | Hessinger et al. | 65—18 |
| 3,098,699 | 7/63 | Roy | 65—18 |
| 3,114,066 | 12/63 | Allen et al. | 65—33 |

FOREIGN PATENTS

| 7,864 | 8/13 | Great Britain. |
|---|---|---|
| 338,334 | 11/30 | Great Britain. |
| 412,110 | 6/34 | Great Britain. |
| 749,924 | 6/56 | Great Britain. |

DONALL H. SYLVESTER, *Primary Examiner.*
OSCAR R. VERTIZ, *Examiner.*